United States Patent [19]
Radovanovic et al.

[11] Patent Number: 5,993,954
[45] Date of Patent: *Nov. 30, 1999

[54] TEMPERATURE-SENSITIVE MICROPOROUS FILM

[75] Inventors: Philip D. Radovanovic, Minneapolis; Gari P. Krogseng, St. Paul; Clinton P. Waller, Jr., White Bear Lake; James S. Mrozinski, Oakdale, all of Minn.; Dennis L. Krueger, Hudson, Wis.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/841,041

[22] Filed: Apr. 29, 1997

[51] Int. Cl.⁶ .......................................... B32B 3/26
[52] U.S. Cl. ..................................... 428/315.5; 428/315.9; 428/316.6; 428/910
[58] Field of Search .............................. 428/315.5, 315.9, 428/316.6, 910

[56] References Cited

U.S. PATENT DOCUMENTS

| | | | |
|---|---|---|---|
| 3,969,562 | 7/1976 | Suzuki | 428/155 |
| 4,247,498 | 1/1981 | Castro . | |
| 4,539,256 | 9/1985 | Shipman . | |
| 4,650,730 | 3/1987 | Lundquist et al. . | |
| 4,731,304 | 3/1988 | Lundquist et al. . | |
| 4,863,792 | 9/1989 | Mrozinski . | |
| 4,867,881 | 9/1989 | Kinzer . | |
| 5,051,183 | 9/1991 | Takita et al. . | |
| 5,225,131 | 7/1993 | Tamaru et al. . | |
| 5,240,655 | 8/1993 | Troffkin et al. . | |
| 5,281,491 | 1/1994 | Rein et al. . | |
| 5,385,777 | 1/1995 | Higuchi et al. . | |
| 5,409,588 | 4/1995 | Mushiake et al. . | |
| 5,453,333 | 9/1995 | Takauchi et al. . | |
| 5,480,745 | 1/1996 | Nishiyama et al. . | |
| 5,565,281 | 10/1996 | Yu et al. . | |

FOREIGN PATENT DOCUMENTS

| | | |
|---|---|---|
| 682 376 A1 | 5/1995 | European Pat. Off. . |
| 718 901 A1 | 6/1996 | European Pat. Off. . |
| 2-77108 | 3/1990 | Japan . |
| 6-93130 | 4/1994 | Japan . |
| 6-182918 | 7/1994 | Japan . |
| 6-208849 | 7/1994 | Japan . |
| 6-336535 | 12/1994 | Japan . |
| 8-27295 | 1/1996 | Japan . |
| 8-34873 | 2/1996 | Japan . |
| 8-64194 | 3/1996 | Japan . |
| 8-99382 | 4/1996 | Japan . |
| 8-138643 | 5/1996 | Japan . |
| 8-138644 | 5/1996 | Japan . |

*Primary Examiner*—Blaine Copenheaver
*Attorney, Agent, or Firm*—Kent S. Kokko

[57] ABSTRACT

A single or multi-layer microporous material of which at least one layer contains a compatible, melt-processible polymer mixture having a first polymer component with a melting point greater than 140° C. and a second polymer component having a melting point lower than 120° C. is described as well as a method of preparing the material. The first polymer component and the second polymer component are miscible in a compound or compatible liquid when heated above the melting temperature of the first polymer component or above the liquid—liquid phase separation temperature and phase separate from the compound or compatible liquid when cooled. The materials are particularly useful as battery separators.

12 Claims, No Drawings

TEMPERATURE-SENSITIVE MICROPOROUS FILM

FIELD OF THE INVENTION

This invention relates to a microporous material or film containing a compatible, melt-processable polymer mixture and a method of making the same. The material or film can be used as a single layer or as part of a multi-layer structure and used in articles such as battery separators or temperature indicators.

BACKGROUND OF THE INVENTION

Porous films made from mixtures of blends of polyolefin materials used as thermal shutdown separators for batteries have been previously described. Depending on the types of polymeric mixtures employed, several disadvantages have been found. For example, porous films made from the use of incompatible polymers result in non-uniform porous structures, thereby limiting their utility. Other porous films employ different grades of the same or miscible polymeric materials but with thermal shutdown temperatures above 125° C. This high shutdown temperature does not provide complete protection against thermal runaway in lithium-ion batteries. For example, under adiabatic conditions, the thermal runaway of a lithium-ion battery with carbon anodes begins at about 120° C. Still other porous films embody mixtures having melting points less than 15° C. apart. Temperature surges in excess of 15° C. may cause potentially dangerous holes to appear if a lithium battery were to overheat.

SUMMARY OF THE INVENTION

The present invention has solved the disadvantages of the prior porous materials by providing a microporous material containing a compatible, melt-processable polymer mixture in a single layer or a multi-layer system of which this mixture comprises at least one layer. The resulting film exhibits a thermal shutdown well below the point of thermal runaway while still retaining good film-like properties such as resistance to break under stress.

Accordingly, the present invention in its first aspect is a microporous material containing a compatible, melt-processable polymer mixture containing: (a) about 15 to 80 parts by weight of a first polymer component having a melting point greater than 140° C., and (b) about 15 to 80 parts by weight of a second polymer component having a melting point lower than 120° C., wherein the first polymer component and the second polymer component are miscible in a compound or compatible liquid when heated above the melting temperature of the first polymer component or the liquid—liquid phase separation temperature and phase separate from the compound or compatible liquid when cooled, and wherein the microporous material becomes substantially impervious to fluid flow or electric current flow when heated above the melting point of the second polymer component and retains film-like properties.

The microporous material may further include about 90 parts by weight or less, based on total solution content, of either (1) a compound miscible with the first polymer component and the second polymer component at a temperature above the melting point of the first polymer component but which phase separates from both polymer components when cooled below the crystallization temperature of one of the polymer components or (2) a compatible liquid miscible with both the first polymer component and the second polymer component at a temperature above the liquid—liquid phase separation temperature but which phase separates from both polymer components by liquid—liquid phase separation when cooled.

A second aspect of the present invention is a method of making a microporous material including the steps of: (a) melt blending to form a solution containing: (i) about 15 to 80 parts by weight, based on total polymer content, of a first polymer component having a melting point greater than 140° C., (ii) about 15 to 80 parts by weight, based on total polymer content, of a second polymer component having a melting point lower than 120° C. wherein the first and second polymer components are compatible, and (iii) a third component comprising either (1) about 40 to 90 parts by weight, based on total solution content, of a compound that is miscible with both the first polymer component and the second polymer component at a temperature above the melting temperature of the first polymer component but that phase separates from both polymer components when cooled below the crystallization temperature of one of the polymer components or (2) about 40 to 90 parts by weight, based on total solution content, of a compatible liquid that is miscible with both the first polymer component and the second polymer component at a temperature above the liquid—liquid phase separation temperature but that phase separates from both polymer components by liquid—liquid phase separation when cooled; (b) forming a shaped material of the melt blended solution; (c) cooling said shaped material to a temperature at which phase separation occurs between said compound or compatible liquid and said polymer components through either (1) crystallization precipitation of the polymer components to form a network of polymer domains comprising the first polymer, second polymer and mixtures thereof in a second phase comprising the compound with adjacent polymer domains being distant but having a multiplicity of zones of continuity, or (2) liquid—liquid phase separation to form a multiplicity of cells of a polymer-lean phase (which are surrounded by a polymer-rich phase); and (d) orienting said material at least in one direction to separate adjacent crystallized polymer domains or polymer-lean cells from one another to provide a network of interconnected micropores.

For purposes of the above description, the term "compatible liquid" means a liquid which is a solvent for both polymer components at a temperature above the liquid—liquid phase separation point, and which phase-separates by liquid—liquid phase separation below such point.

The term "zones of continuity" means polymer domains of a single polymer or polymer blend which domains under microscopic examination, may appear as spherulites or stacked lamellae. After orientation, the domains or (spherulties or stacked lamellae) are interconnected by fibrils.

The method of making a microporous film may further comprise a washing step to remove the compound or compatible liquid.

A third aspect of the present invention is a multi-layer microporous film containing the above-described microporous material as a porous layer and at least one additional porous layer. The additional porous layer in the multi-layer system includes a phase-separated polymer mixture as above described, a porous layer containing a crystallization phase-separated, melt-processible polymer, or a porous layer containing a liquid—liquid phase-separated, melt-processible polymer.

When an additional porous layer is used and is of a polymer rather than the above described polymer mixture, the melting temperature of the polymer is preferably above 120° C. and more preferably above 140° C.

A fourth aspect of the present invention is a method of making the multi-layer microporous film including the steps of: (a) forming a first porous layer composition by melt blending to form a solution containing: (i) about 15 to 80 parts by weight, based on total polymer content, of a first polymer component having a melting point greater than 140° C., (ii) about 15 to 80 parts by weight, based on total polymer content, of a second polymer component compatible with the first polymer component and having a melting point lower than 120° C., and (iii) a third component comprising either (1) about 40 to 90 parts by weight, based on total solution content, of a compound that is miscible with both the first polymer component and the second polymer component at a temperature above the melting temperature of the first polymer component but which phase separates from both polymer components when cooled below the crystallization temperature of one of the polymer components or (2) about 40 to 90 parts by weight, based on total solution content, of a compatible liquid that is miscible with both the first polymer component and the second polymer component at a temperature above the liquid—liquid phase separation temperature but which phase separates from both polymer components by liquid—liquid phase separation when cooled; (b) forming at least one additional porous layer composition by (i) repeating the process of (a); (ii) forming a solution of a polymer with a compound at a temperature above the melting point of the polymer; or (iii) forming a solution of a polymer with a compatible liquid at a temperature above the liquid—liquid phase separation point; (c) forming a multi-layer film from said first porous layer composition and said additional porous layer composition by coextrusion; (d) cooling said multi-layer film to cause phase separation; and (e) orienting said multi-layer film to cause a porous film structure.

This method of making a microporous film may further contain a washing step to remove the compound or compatible liquid.

The present invention also includes the use of the above-described single or multi-layer films in applications such as a battery separator with a low-temperature thermal shutdown feature and high thermal resistance for use especially in secondary lithium-ion batteries. The present invention also includes the use of the above-described materials in temperature indicators which change transparency by crossing the melting point of the lower melting polymer component in the above-described microporous material, temperature-controlled separation membranes useful for example in safety valves.

The above-described microporous material has the novel and unique feature that it significantly changes its properties, such as air permeability, electrical resistance in an electrolyte solution, thickness, porosity, pore size, transparency and the like, by heating above the melting point of the lower melting polymer component while maintaining the mechanical integrity all the way up to the melting point of the higher melting polymer component.

The multi-layer structure or film containing at least one additional porous layer to the above-described microporous material may improve the overall properties important for a given application, such as mechanical strength, elastic modulus, thermal shrinkage, puncture resistance, burst pressure and others.

DETAILED DESCRIPTION

The microporous material or film of the present invention includes a compatible, melt-processible polymer mixture.

The polymer mixture contains two polymer components, the first having a melting point greater than 140° C., preferably greater than 160° C., and the second component having a lower melting point, i.e., a melting point lower than 120° C.

As used herein, the term "polymer component" refers only to conventional polymers which are melt-processible under ordinary melt processing conditions.

As used herein, the term "crystalline" with regard to polymer components includes polymers which are at least partially crystalline, preferably having a crystallinity of greater than 20% as measured by Differential Scanning Calorimetry (DSC). Crystalline polymer structures in melt-processed polymers are well known.

As used herein, the term "melting temperature" refers to the temperature at or above which one of the polymer components in a blend with a compound will melt.

As used herein, the term "crystallization temperature" refers to the temperature at or below which one of the polymeric components in a blend with a compound or compatible liquid, will crystallize.

As used herein, the term "liquid—liquid phase separation temperature" refers to the temperature at or below which a melt of a compatible polymer mixture, i.e., a homogeneous polymer-melt, phase separates by either binodal or spinodal decomposition.

As used herein, the terms "compatible" or "a compatible mixture" refers to a material capable of forming a fine dispersion (less than 1 micron in particle size) in a continuous matrix of a second material or capable of forming an inter-penetrating polymer network of both materials.

As used herein, the term "film-like" property refers to a continuous film resistant to break under stress.

Polymers useful in the present invention include olefinic, condensation and oxidation polymers. Preferred polymers are olefinic. The above polymers are divided into first polymer components and second polymer components by way of their melting points. Those having a melting point greater than 140° C. belong to the first polymer component category and those having a melting point lower than 120° C. are in the category of the second polymer component. The polymer components are compatible in the mixture.

Miscibility and compatibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, Flory-Huggins interaction parameter between two non-polar polymers is always a positive number. Thermodynamic considerations require that for complete miscibility of two polymers in the melt, the Flory-Huggins interaction parameter has to be very small (e.g. less than 0.002 to produce a miscible blend starting from 100,000 weight-average molecular weight components at room temperature).

Compatibility is difficult to define in terms of exact thermodynamic parameters, since kinetic factors, such as melt processing conditions, degree of mixing, and diffusion rates can also determine the extent of compatibilization. Some examples of compatible polyolefin blends are low density polyethylene and ethylene propylene diene monomer, low density polyethylene and ethylene vinyl acetate, polypropylene and ethylene propylene rubber, polypropylene and ethylene alpha-olefin copolymers, polypropylene and polybutylene.

In the presence of a common diluent or compound that is miscible with both polymers above their melting temperatures, the thermodynamic requirements for miscibility relax. Two polymers with a Flory-Huggins interaction parameter that is significantly greater than the critical value for miscibility in a binary system, can still be miscible in a melt comprising a ternary system with a common solvent, at least over a range of compositions.

Compatibility affects the range of useful polymer concentrations. If polymers are compatible, a common solvent can promote their miscibility into the composition regions of much higher polymer concentrations, thus allowing the use of common processing techniques such as extrusion to make articles of this invention. Under these conditions, all components in the melt are miscible and phase-separate by crystallization precipitation or liquid—liquid mechanism upon cooling below the phase separation temperature. The rate of cooling is quite rapid and controlled by the process conditions which minimizes the size of phase-separated microdomains and provides uniformity on a microscopic level.

Compatibility also affects the film uniformity. Cast films that are made from compatible blends by the method of this invention are transparent which confirms the uniformity on a microscopic level. This uniformity is of great importance for successful post-processing: films with a lesser degree of uniformity made from incompatible polymers easily break during stretching. Film uniformity is also important in some applications, such as thermal shutdown battery separators, where a reliable shutdown performance on a microscopic level is desirable to prevent local overheating when a short develops across the separator.

In the case where crystallization precipitation is used to make articles of the invention, polypropylene having a crystallinity of greater than 20% is preferred as the first component. As a second component, a preferred polymer is a copolymer of ethylene and alpha-olefin monomers having a crystallinity of greater than 20%. The alpha-olefin monomers may, for example, include 1-butene to 1-hexene. If polymer components have a crystallinity of less than about 20%, it is very difficult to make a porous film by crystallization precipitation.

In the case where liquid—liquid phase separation is used to make articles of this invention, both the first and the second components can have crystallinity of less than 20%. Under these conditions, the preferred first component is polypropylene and the preferred second component is polybutylene.

The microporous material or at least one porous layer in a multi-layer system may be prepared by melt blending the polymer mixture above described to form a solution by heating the mixture with a third component at a temperature above the melting temperature of the first polymer component or above the liquid—liquid phase separation temperature, depending on the phase separation mechanism employed. Depending on which phase separation is used, the third component may be a compound or a compatible liquid.

The phase separation mechanism that is used is determined by both thermodynamic and kinetic factors. Thermodynamic factors are illustrated by an equilibrium phase diagram of the 3 components. However, because the phase separation often occurs over a relatively short time, equilibrium conditions may not be reached and kinetic factors may then dominate. Thus, while an equilibrium phase diagram may indicate that a crystallization precipitation phase separation may occur, a faster liquid—liquid separation mechanism may dominate.

Materials useful as third components are those that form a solution with a mixture of first polymer component and second polymer component at an elevated temperature to form a solution but also permit the components to phase separate when cooled. Useful third component materials include (1) those mentioned as useful compounds in Shipman, U.S. Pat. No. 4,539,256, incorporated herein by reference, (2) those mentioned as useful compatible liquids in Kinzer, U.S. Pat. No. 4,867,881, incorporated herein by reference, and (3) additional materials such as, dodecyl alcohol, hexadecyl alcohol, octadecyl alcohol, dicyclohexylphthalate, triphenyl phosphate, paraffin wax, liquid paraffin, stearyl alcohol, o-dichlorobenzene, trichlorobenzene, dibutyl phthalate, dibutyl sebacate, and dibenzyl ether.

Compounds suitable for the melt blending operation with a polymer mixture to make the microporous material of the invention by crystallization precipitation are liquids or solids at room temperature and in which the crystallizable polymer mixture will dissolve to form a solution at a temperature above the melting temperature of the first polymer component but will phase separate on cooling at or below the crystallization temperature of one of the polymer components.

Preferably, these compounds have a boiling point at atmospheric pressure at least as high as the melting temperature of the first polymer. Compounds having lower boiling points may be used in those instances where superatmospheric pressure may be employed to elevate the boiling point of the compound to a temperature at least as high as the melting temperature of the first polymer component. Generally, suitable compounds have a solubility parameter within a few units of the values of this parameter for the first polymer component and second polymer component.

Particularly useful with polypropylene are mineral oil, dioctylphthalate, or mineral spirits. Mineral oil and mineral spirits are examples of mixtures of blending compounds since they are typically blends of hydrocarbon liquids. These are especially useful in the polymer mixture of the present invention.

For a polymer-mixture separated by liquid—liquid phase separation, a compatible liquid is used to make up the solution in the preparation of the microporous material. The compatible liquid is a liquid or solid material at room temperature that is capable of forming a solution with the polymer mixture when heated above the liquid—liquid phase separation temperature and which phase separates from the polymer components by liquid—liquid phase separation, rather than crystallization precipitation, on cooling. The compatibility of the liquid with the polymers can be determined by heating the polymers and the liquid to form a clear homogeneous solution. If a solution of the polymers and the liquid cannot be formed at any liquid concentration, then the liquid is inappropriate for use with those polymers. In practice, the liquid used may include compounds which are solid at room temperature but liquid at the melt temperature of the first polymer compound.

The operability of a specific liquid with a given polymer mixture cannot be predicted with absolute certainty. However, certain guidelines can be set forth. For non-polar polymers, non-polar organic liquids with similar room temperature solubility parameters are generally useful at the solution temperatures. Similarly, polar organic liquids are generally useful with polar polymers. Blends of two or more liquids can be used as the compatible liquid as long as the selected polymer mixture is soluble in the liquid blend at the liquid—liquid phase separation temperature and the solution formed separates by liquid—liquid phase separation on cooling. When the first polymer component selected is polypropylene, esters such as dibutyl phthalate and ethers such as dibenzyl ether are particularly useful as the compatible liquid.

The compatible liquid can also phase separate from one component of the compatible polymer mixture by liquid—liquid phase mechanism, while phase separating from the other component of the compatible polymer mixture by crystallization precipitation. In that case, hybrid structures form, and these structures can resemble more one of the two structures described above, obtained by crystallization precipitation or liquid—liquid phase separation, respectively. Thus, for example, when the first component selected is polypropylene and the second polymer component is polybutylene, an ester such as dioctyl phthalate is particularly useful to obtain a hybrid structure.

The microporous material may also contain, in addition to compounds above described, conventional fillers or additive materials in limited quantity so as not to interfere with the formation of the microporous material of the present invention, and so as not to result in unwanted exuding of the additive. Such additives may include anti-static materials, dyes, plasticizers, UV absorbers, nucleating agents and the like. The amount of additive is typically less than 10% of the weight of the polymeric mixture, preferably less than 2% by weight.

Once the melt blended solution is prepared, a shaped material is then formed by known methods, for example, employing an extruder. Cooling of the shaped material then takes place either in the extruder, at or near the die, or preferably by casting the shaped material onto a casting wheel or drum. Cooling causes the phase separation to occur between the compound or compatible liquid and the polymer components. In the present invention this may occur either by crystallization precipitation of the polymer components to form a network of polymer domains comprising the first polymer, second polymer and mixtures thereof in a second phase comprising the compound with adjacent polymer domains being distant but having a plurality of zones of continuity, or by a liquid—liquid phase separation to form cells of a polymer-lean phase.

The shaped material is then oriented at least in one direction to separate adjacent crystallized polymer domains or polymer-lean cells from one another to provide a network of interconnected micropores.

Some or all of the blending compound or compatible liquid may be removed from the microporous shaped material. Removal may be by washing, extraction or any other convenient known method. This may be done either before or after orientation of the shaped material.

The multi-layer microporous material or film of the present invention contains the above-described microporous material as a layer with at least one additional porous layer. By way of example, in a three-layer system the above-described porous layer is preferably the center layer sandwiched by, i.e., in between the additional porous layers.

The additional porous layers may include the same porous layer above described, namely, the phase-separated polymer mixture containing compatible polymeric mixtures. The porous layers may also include a crystallization phase-separated, melt-processible polymer such as described in U.S. Pat. No. 4,539,256, or a porous layer comprising a liquid—liquid phase-separated, melt-processible polymer as described in U.S. Pat. No. 4,867,881.

The additional porous layers may be prepared by melt-blending solutions such as described in U.S. Pat. Nos. 4,539,256 and 4,867,881, the former describing a melt blend solution of a compound with a crystallization phase-separated, melt-processible polymer and the latter describing a melt blend solution of a liquid—liquid phase-separable, melt-processible polymer and a compatible liquid.

The multi-layer film is then formed by coextrusion of the two or more polymer compositions followed by cooling to cause phase separation and then orientation of the multi-layer film to form a porous film structure. The coextrusion may employ a feedblock or a multi-manifold die. Cooling preferably comprises casting the multi-layer film onto a casting wheel. In addition, the multi-layer film can be made by lamination means.

The compound or compatible liquid used in the melt blends of the multi-layer films may also be removed by any conventional method such as washing or solvent extraction. This may be done either before or after orientation of the multi-layer film.

Once the blending compound or compatible liquid has been removed, the resultant microporous material or multi-layer film may be imbibed with various fillers to provide any of a variety of specific functions, thereby providing unique articles. For example, the imbibing material or filler may be a liquid, solvent solution, solvent dispersion or solid. Such filler may be imbibed by any of a number of known methods which results in the deposition of such fillers within the porous structure of the microporous sheet. Some imbibing materials are merely physically placed within the microporous sheet. In some instances, the use of two or more reactive components as the imbibing materials permits a reaction within the microporous sheet structure. Examples of imbibing material include antistatic agents, surfactants, and solid particulate material such as activated carbon and pigments. Certain materials such as antistatic agents or surfactants, may be imbibed without removal of the compound or compatible liquid.

The microporous materials or multi-layer films of the present invention may be employed in any of a wide variety of situations wherein microporous structures may be utilized. Particularly, they are used as battery separators.

When the porous films of the invention are heated to a temperature above the melt temperature of the second polymer component the pore openings change in a substantially uniform manner. The uniform characteristic is due to the polymer mixture having gone through a solution state during the formation process of the porous film. While the first component maintains a film-like structure the second component flows into the open pores. The porous film will shrink in the direction in which it is not restrained (i.e., length, width, thickness) and will change in appearance from opaque to translucent or transparent depending on the pore size, percent void volume and the concentration of the second polymer component. No change in appearance results when the pore size or percent void volume is too large for the amount of second polymer component that is present to significantly reduce the openings. A translucent appearance results when the pores are significantly reduced in openness. Transparency results when the pores are substantially closed to the flow of a liquid.

Generally the pore size and percent void volume are determined by the amount of compound or compatible liquid used to make the porous film. Preferably from 40 to 90 parts of a compound or from 40 to 90 parts of a compatible liquid are used per 100 parts of polymer solution. As less compound or compatible liquid is used, the pore size generally decreases and the fluid or electric current flow through the porous film decreases. As more compound or compatible liquid is used, the pore sizes and percent void volume generally increase. However, pore sizes and percent void volume are also influenced to some extent by polymer types and relative concentrations, processing conditions and nucleating agent presence. Thus, judicious selection of polymer materials and concentrations, compound or compatible liquid concentrations, processing temperatures and nucleating agent concentrations will result in desired pore sizes and percent void volume.

For the appearance or resistance to liquid flow of the porous film to change upon heating above the melting temperature of the second polymer component, the concentration of the second polymer must be sufficient to significantly alter the pore sizes and percent void volume of the porous film. Typically, the second polymer component can range in concentration per the total polymer mixture from 15 to 80 parts, preferably from 30 to 75 parts and more preferably from 50 to 70 parts. As stated earlier, more of the second polymer component is needed as the pore size and percent void volume are made larger.

After the porous film is heated to a temperature above the melting temperature of the second component, the film-like structure of the porous film is maintained by the first component. The film structure can be illustrated by the ability of a film to hold a suspended weight. Increased shrinkage occurs in the direction in which the film is not restrained upon melting of the second component of the polymer mixture. This is due to much easier stress relaxation of the molecules of the first polymer component in the presence of the melted second polymer component. If insufficient first polymer component is present, the porous film will lose its integrity, its viscosity will reduce from an ultra high value to a much lower value, it will start flowing under a suspended weight and it will break. Typically, the first polymer component can range in concentration per the total polymer mixture from 15 to 80 parts, preferably from 20 to 60 parts and more preferably from 30 to 50 parts.

The melting temperatures of the first component and the second component must be sufficiently different to minimize the occurrence of the film-like structure supported by the first component also collapsing if temperatures were to rise significantly above that of the melting temperature of the second component. If the microporous film of the invention were to be used as a battery separator in a lithium ion battery, for example, the microporous film would function as a shut off to prevent an explosion of the battery if it malfunctioned. If the microporous film does not maintain its film-like properties above 120° C., a runaway reaction can still occur in localized heated spots. To prevent an undesired collapse of the structure resulting from the first component melting, the melting temperature of the first component should be at least 20° C. above that of the second component, preferably at least 40° C. above that temperature.

Surprisingly, the inventors have found that a mixture of polymer components could be formed into a microporous film that could be rendered non-porous at a temperature under 120° C. but would remain film-like until at least 140° C. It was not known that such materials could be mixed in a sufficient manner to avoid localized breakthroughs of electrical current as can occur with incompatible materials.

In the following non-limiting examples, all parts and percentages are by weight unless otherwise indicated. In evaluating the materials of the invention and the comparative materials, the following test methods are used.

EXAMPLES

Test Methods

Gurley air flow This value is a measurement of time in seconds required to pass 10 cc of air through a film according to ASTM D-726 Method B. A value of greater than 10,000 sec/10 cc is assigned if the Gurley timer does not start 15 minutes after the start of the test.

Bubble point pore size This value is measured in micrometers according to ASTM F-316 using FLUORINERT™ FC-43 solvent as a wetting fluid.

Thickness This value is measured in micrometers using a TMI direct contact gauge.

Crystallinity and melting point

Crystallinity was determined by conducting a differential scanning calorimetry at 10° C./min heating and cooling rates on samples of finished films from the corresponding examples and by measuring the heat of fusion during the second cooling cycle. To obtain the percent crystallinity, this heat of fusion was divided by the heat of fusion of the 100% crystalline polymer which was taken from the literature as follows: 209 J/g for polypropylene, 146 J/g for polybutylene, and 277 J/g for high density polyethylene, low density polyethylene and ethylene alphaolefin copolymers. Melting point was determined as the melting peak temperature obtained during the second heating cycle.

Thermal Shutdown Test

A small film sample was restrained at its perimeter in a frame in which very little tension is applied to the film. Pores of the film were then filled with an electrolyte solution of 0.1 M LiCl in propylene carbonate. The film sample was sandwiched between platinum foil electrodes and placed in a petri dish and then the dish was placed on a hot plate. The top and bottom electrodes were connected to a conductivity meter. A small plastic weight was attached to the top electrode and a thermocouple was added for recording temperature. The added weight and surface area of the electrode was calculated to produce a pressure of approximately 10 psi (68.9 KPa).

The test consisted of slowly heating the petri dish with the hot plate and recording the analog signals from the thermal couple and conductivity meter onto an X-Y chart recorder. The approximate time to reach 120° C. during the test was six minutes.

Example 1

A 50:50 dry blend by weight of crystallizable polypropylene (available under the trade designation DS 5D45 from Shell Chemical Co.) with a melt flow index of 0.65 dg/min (ASTM D1238, Condition I), crystallinity of 48% and a melting point of 165° C. (measured by DSC) and crystallizable ethylene-butene copolymer (available under the trade designation Exact 3125 from EXXON) with a melt flow index 1.2 dg/min (ASTM D1238, Condition E), crystallinity of 24% and a melting point of 107° C. was fed into the hopper of a 25 mm twin-screw extruder. Mineral oil (available under a trade designation White Mineral Oil #31 from Amoco) having a viscosity of 60 centistokes (ASTM D445 at 40° C.) was introduced into the extruder through an injection port at a rate to provide a composition of 45% by weight of the polymer blend and 55% by weight mineral oil. The polymer blend also contained 0.1% MILLAD™ 3905 (a nucleating agent available from Miliken). The overall feed rate was 3.63 kg/hr. The polymer blend was heated to 271° C. in the extruder to melt and, after mixing with oil, the temperature was maintained at 173° C. during the extrusion. The melt was extruded through a 30.5 cm-wide coat hanger slit die and cast as a 150 μm-thick transparent film onto a casting wheel maintained at 65° C. and having a patterned surface with a multiplicity of small pyramid shaped protrusions that provided about 10% contact area with a cast film. Samples of cast film were restrained in a frame and washed in VERTREL™ 423 (HCFC 123) solvent (available from duPont) for 20 minutes, then dried for 15 minutes at ambient temperature. The initially-transparent film turned opaque during drying. The resulting film was oriented 2 by 1.5 times (ie. 2× in the machine direction and 1.5× in the transverse or cross web direction) at 93° C. The oriented film had a bubble point pore size of only 0.12 μm indicating good uniformity at a microscopic level. Gurley air flow and thickness of the oriented film were measured before and after heating the film restrained in a frame for 10 minutes at 110° C. and the results are reported in Table 1.

Example 2

A 30:70 polypropylene:ethylene-butene copolymer blend was used to prepare a film as described in Example 1 with the only difference besides the polymer ratio that the polymer blend contained 0.15% MILLAD™ 3905 as a nucleating agent. The oriented film had a bubble point pore size of 0.18 μm. Gurley air flow and thickness of the oriented film were measured before and after heating the film restrained in frame for 10 minutes at 110° C. and the results are reported in Table 1.

Example 3

A 50:50 blend of polypropylene and ethylene-hexene copolymer (available from Exxon Chemical under the trade designation SLP-9057) with a melt flow index 1.2 dg/min (ASTM D1238, Condition E), crystallinity of 30% and a melting point of 111° C. was used to prepare a film as described in Example 1 with the only difference that the polymer blend contained 0.15% MILLAD™ 3905 as a nucleating agent. The oriented film had a bubble point pore size of 0.21 μm. Gurley air flow and thickness of the oriented film were measured before and after heating the film restrained in a frame for 25 minutes at 115° C. and the results are reported in Table 1.

Example 4

A 50:50 polypropylene:ethylene-butene copolymer blend was used to prepare a film as described in Example 1 with the only difference that the polymer blend did not contain any nucleating agents. The oriented film had a bubble point pore size of 0.37 μm. Gurley air flow and thickness of the oriented film were measured before and after heating the film restrained in frame for 10 min at 110° C. and the results are reported in Table 1.

Example 5

A 70:30 polypropylene:ethylene-butene copolymer blend was used to prepare a film as described in Example 1 with the following differences: the polymer blend contained 0.15% MILLAD™ ™ 3905 as a nucleating agent, the cast film was not washed to remove mineral oil and the cast film was oriented 2 by 2 times at ambient conditions. Gurley air flow and thickness of the oriented film were measured before and after heating the film restrained in frame for 10 min at 100° C. and the results are reported in Table 1.

TABLE 1

| | Initially | | After Heating | | |
|---|---|---|---|---|---|
| Example Number | Gurley Air Flow (s/10 cc) | Thickness (μm) | Gurley Air Flow (s/10 Occ) | Thickness (μm) | Visual appearance |
| 1 | 15 | 56 | 846 | 33 | Translucent |
| 2 | 8 | 63 | >10,000 | 30 | Transparent |
| 3 | 6 | 81 | 26 | 46 | Translucent |
| 4 | 14 | 81 | 400 | 53 | Translucent |
| 5 | 392 | 91 | >10,000 | 74 | Translucent |

Comparative Example 1

Ethylene-butene copolymer was used to prepare a film as described in Example 1 with the only difference that no nucleating agent was used. Gurley air flow and thickness of the oriented film were 2 s/10 cc and 79 μm, respectively. After heating the film restrained in a frame in the oven for 10 min at 110° C., the film turned transparent, Gurley air flow increased to greater than 10,000 sec/10 cc, while thickness reduced to 25 μm.

Example 6

Samples of oriented films made according to Examples 1 and 2 and Comparative Example 1 were cut to 2.5 cm width and put for 10 min in the oven at 140° C., under a constant 10 g weight. The results of this test are described in Table 2.

TABLE 2

| Example Number | Film Performance |
|---|---|
| 1 | Observed 25% shrinkage, film became transparent |
| 2 | Observed 15% shrinkage, film became transparent |
| C1 | Film melted and broke in 15 seconds |

Comparative Example 2

A 50:50 polypropylene:ethylene-butene copolymer blend was used to prepare a film as described in Example 1 with the only difference that a different grade of ethylene-butene copolymer was used: Exact 3128 with a melt flow index 1.2 dg/min (ASTM D1238, Condition E), crystallinity of 16% and a melting point of 95° C. After the washing and drying steps, film remained transparent and could not be made porous by stretching.

Comparative Example 3

A 50:50 polypropylene:polyethylene blend was used to prepare a film as described in Example 1. The polyethylene used was a high density polyethylene (available under the trade designation Fina 2804) with a melt flow index 0.8 dg/min (ASTM D1238, Condition E), crystallinity of 53% and a melting point of 130° C. The cast film had low crossdirectional strength and was translucent indicating insufficient compatibility between polymers. After the washing and drying steps, film could not be stretched 2 by 1.5 without breaking.

Comparative Example 4

A 50:50 polypropylene:polybutylene blend was used to prepare a film as described in Example 1. The grade of polybutylene used was PB0200 (available from Shell Chemical Company) with a melt flow index 1.8 dg/min (ASTM D1238, Condition E), crystallinity of 20% and a melting point of 114° C. After the washing and drying steps, film remained transparent and could not be made porous by stretching.

Comparative Example 5

A 50:50 polypropylene:polyethylene blend was used to prepare a film as described in Example 1. The polyethylene used was a low density polyethylene (available under the trade designation TENITE™ 1550P from Eastman Chemical Company) with a melt flow index 3.6 dg/min (ASTM D1238, Condition E), crystallinity of 24% and a melting point of 108° C. The cast film had low crossdirectional strength and a high frequency of gel particles indicating poor compatibility between polymers. After the washing step, film split in the frame during drying.

Example 7

A mixture of 60% compatible liquid dioctylphthalate (available from Eastman Chemical Company), 22% DURAFLEX™ 8510 (a polybutylene, melting point 90° C., available from Shell Chemical Company), and 18% PROFAX™ 6723 (a polypropylene, melting point 168° C. (335° F.), available from Himont) was extruded in a 25 mm twin-screw extruder at 3.6 kg/hr (8 lbs/hr) at 182° C. (360° F.). The extrudate was formed into a sheet using a 20.3 cm-wide coat hanger slit die. The film was then quenched by drop casting onto a casting wheel having a surface temperature of 66° C. (150° F.) and a patterned surface having a multiplicity of small indentations with an inverted pyramid shape (as would be formed by embossing the surface with a knurled roll) that provided about 30% contact area (i.e. land area between the indentations) with the cast film.

The continuous sample was then wound on a film core. Pieces were then cut off and submerged in VERTREL™ 423 to extract the compatible liquid. The samples were allowed to dry unrestrained. One of the samples was length-oriented 2.75 times at 66° C. (150° F.). The cast film sample, having a thickness of 114 micrometers (4.5 mils), and the oriented sample having a thickness of 51 micrometers (2.0 mils), were tested for thermal shutdown as above described. Both samples exhibited almost complete loss of porosity as shown by an almost complete loss of electrolytic conductivity at 110° C.

Example 8

A 30:70 polypropylene:ethylene-butene copolymer blend was fed into the hopper of a 40 mm twin-screw extruder. Mineral oil was introduced into the extruder through an injection port at a rate to provide a composition of 35% by weight of the polymer blend and 65% by weight mineral oil. The composition also contained 0.12% MILLAD™ 3905 as a nucleating agent. The overall feed rate was 11.35 kg/hr. The polymer blend was heated to 271° C. in the extruder to melt and, after mixing with oil, the temperature was maintained at 188° C. during the extrusion. The melt was extruded through a 38.1 cm-wide coat hanger slit die and cast as a 178 μm-thick transparent film onto a casting wheel maintained at 54° C. and having a patterned surface with a multiplicity of small pyramid-shaped protrusions that provided about 10% contact area with a cast film. The cast film was oriented 3 to 1 in the machine direction at 49° C., then 3 to 1 in the cross-web direction at 66° C. Samples of oriented film were restrained in a frame and washed in VERTREL™ 423 for 10 minutes, then dried for 15 minutes at ambient temperature. Gurley air flow and thickness of the washed film were 91 s/10 cc and 20 μm, respectively. After heating this film, restrained in a frame for 10 minutes at 110° C., Gurley air flow increased to more than 10,000 s/10 cc, while film thickness reduced to 13 μm.

Example 9

A 30:70 polypropylene:ethylene-butene copolymer blend was used to prepare a cast film as described in Example 8 except it contained 30% by weight of the polymer blend and 70% by weight mineral oil. The cast film was washed in VERTREL™ 423 and oriented 2 to 1 in the machine direction at 93° C. Gurley air flow and thickness of the oriented film were 20 s/10 cc and 71 μm, respectively. After heating this film, restrained in a frame for 10 minutes at 110° C., Gurley air flow increased to more than 10,000 s/10 cc, while film thickness reduced to 48 μm.

Example 10

A 20:80 polypropylene:ethylene-butene copolymer blend was used to prepare a cast film as described in Example 8 with the only difference that it contained 70% by weight mineral oil. The cast film was washed in Vertrel 423 and oriented 2 to 1 in the machine direction at 93° C. Gurley air flow and thickness of the oriented film were 7 s/10 cc and 81 μm, respectively. After heating this film, restrained in a frame for 10 minutes at 110° C., Gurley air flow increased to more than 10,000 s/10 cc, while film thickness reduced to 36 μm.

Example 11

A 50:50 polypropylene:ethylene-butene copolymer blend was fed into the hopper of a 25 mm twin-screw extruder. Mineral oil was introduced into the extruder through an injection port at a rate to provide a composition of 45% by weight of the polymer blend and 55% by weight mineral oil. The polymer blend also contained 0.3% MILLAD™ 3905 as a nucleating agent. The overall feed rate was 3.63 kg/hr. The polymer blend was heated to 271° C. in the extruder to melt and, after mixing with oil, the temperature was maintained at 193° C. during the extrusion. This composition provided the first melt stream in this Example.

Polypropylene was fed into the hopper of a 40 mm twin-screw extruder. Mineral oil was introduced into the extruder through an injection port at a rate to provide a composition of 55% by weight of polypropylene and 45% by weight mineral oil. This composition also contained 0.1% MILLAD™ 3905 as a nucleating agent. The overall feed rate was 14.53 kg/hr. Polypropylene was heated to 271° C. in the extruder to melt and, after mixing with oil, the temperature was maintained at 188° C. during the extrusion. This composition provided the second melt stream in this Example.

The first and second melt streams were combined in a feed block, extruded through a 38.1 cm-wide coat hanger slit die and cast as a 140 μm-thick transparent film onto a casting wheel maintained at 60° C. and having a patterned surface with a multiplicity of small pyramid-shaped protrusions that provided about 10% contact area with a cast film. The cast film was washed in VERTREL™ 423, dried, then oriented 4 to 1 in the machine direction at 54° C. and 2.2 to 1 in the cross-web direction at 93° C. The bubble point pore size and Gurley air flow of the oriented film were 0.10 μm and 5 s/10 cc, respectively. After heating this film, restrained in a frame for 10 minutes at 115° C., Gurley air flow increased to 45 s/10 cc.

Example 12

A 30:70 polypropylene:ethylene-butene copolymer blend was fed into the hopper of a 25 mm twin-screw extruder.

Mineral oil was introduced into the extruder through an injection port at a rate to provide a composition of 45% by weight of the polymer blend and 55% by weight mineral oil. The polymer blend did not contain any nucleating agent. The overall feed rate was 4.09 kg/hr. The polymer blend was heated to 271° C. in the extruder to melt and, after mixing with oil, the temperature was maintained at 166° C. during the extrusion. This composition provided the first melt stream in this Example.

Polypropylene was fed into the hopper of a 40 mm twin-screw extruder. Mineral oil was introduced into the extruder through an injection port at a rate to provide a composition of 55% by weight of polypropylene and 45% by weight mineral oil. This composition also contained 0.15% MILLAD™ 3905 as a nucleating agent. The overall feed rate was 7.26 kg/hr. Polypropylene was heated to 271° C. in the extruder to melt and, after mixing with oil, the temperature was maintained at 188° C. during the extrusion. This composition provided the second melt stream in this example.

The first and second melt streams were combined in a feed block in such a way that the first melt stream formed the center layer, while the second melt stream was split in half to provide the skin layers of the coextruded structure. The combined melt streams were extruded through a 38.1 cm-wide coat hanger slit die and cast as a 142 µm-thick transparent film onto a casting wheel maintained at 66° C. and having a patterned surface with a multiplicity of small pyramid-shaped protrusions that provided about 10% contact area with a cast film. The cast film was washed in VERTREL™ 423, dried, then oriented 3 to 1 in the machine direction at 88° C. and 1.5 to 1 in the cross-direction at 96° C. Gurley air flow of the finished film was 3 s/10 cc. After heating the finished film, restrained in a frame for 10 minutes at 110° C., Gurley air flow increased to 6,000 s/10 cc.

Example 13

The porous film of Example 2 was saturated with a 1-M lithium triflate in an ethylene carbonate/propylene carbonate (50:50 by volume) solution. The saturated porous film was placed between two stainless steel electrodes to form a conductive cell. The electrodes were positioned to provide physical contact between the electrodes and the porous film with minimal porous film compression. In addition, the separator perimeter beyond the working electrode, was constrained to prevent separator shrinkage. The AC cell impedance at 38 kHz was measured using a EG&G Model 273A potentiostat with a Schlumberger SI1260 frequency-response analyzer as the cell temperature was increased. The cell was heated from room temperature to 186° C. at an average rate of 4° C. per min. The porous film area-specific impedance abruptly increased from 12 $\Omega$-cm$^2$ at 108° C. to 3300 $\Omega$-cm$^2$ at 112° C. The area-specific impedance remained greater than 817 $\Omega$-cm$^2$ even at 186° C.

For purposes of this description, the term "parts by weight" refers to weight percent based on total polymer mixture or total solution content weight if solution is mentioned.

We claim:

1. A microporous material comprising a compatible, melt-processible polymer mixture comprising:
   (a) about 15 to 80 parts by weight of a first polymer component having a melting point greater than 140° C., and
   (b) about 15 to 80 parts by weight of a second polymer component having a melting point lower than 120° C., wherein the first polymer component and the second polymer component are miscible in a compound or compatible liquid when heated above the melting temperature of the first polymer component or the liquid—liquid phase separation temperature and phase separate from the compound or compatible liquid when cooled, and wherein the microporous material becomes substantially resistant to fluid or electric current flow when heated above the melting point of the second polymer component and retains film-like properties.

2. The material of claim 1 further comprising about 90 parts by weight or less, based on total solution content, of either (1) a compound miscible with the first polymer and the second polymer at a temperature above the melting point of the first polymer but which phase separates from both polymers when cooled below the crystallization temperature of one of the polymers or (2) a compatible liquid miscible with both the first polymer and the second polymer at a temperature above the liquid—liquid phase separation temperature but which phase separates from both polymers by liquid—liquid phase separation when cooled.

3. The material of claim 1, wherein the first polymer (a) of the polymer mixture has a melting point of greater than 160° C.

4. The material of claim 1, wherein the polymer mixture comprises polyolefins.

5. The material of claim 1, wherein the first polymer (a) is a polypropylene having a crystallinity of greater than 20%.

6. The material of claim 5 wherein said second compatible polymer is selected from the group of ethylene-butylene copolymers and ethylene-hexene copolymers.

7. The material of claim 1, wherein the second polymer (b) is a copolymer of ethylene and α-olefin monomers having a crystallinity of greater than 20%.

8. The material of claim 1, wherein the compound is mineral oil.

9. A multi-layer microporous film comprising a microporous layer according to claim 1 and at least one additional microporous layer.

10. The film of claim 9 wherein the additional microporous layer comprises:
   (a) a microporous layer comprising a phase-separated polymer mixture comprising:
     (i) about 15 to 80 parts by weight of a first polymer having a melting point greater than 140° C., and
     (ii) about 15 to 80 parts by weight of a second polymer having a melting point lower than 120° C., wherein the first polymer and the second polymer are miscible in a compound or compatible liquid when heated above the melting temperature of the first polymer or the liquid—liquid phase separation temperature and phase separate from the compound or compatible liquid when cooled, and wherein the microporous material becomes substantially resistant to fluid or electric current flow when heated above the melting point of the second polymer component and retains film-like properties;
   (b) a crystallization phase-separated, melt-processible polymer, or
   (c) a liquid—liquid phase-separated, melt-processible polymer.

11. The film of claim 9, wherein the first polymer (a) of the polymer mixture of the microporous layer is a polypropylene having a crystallinity of greater than 20%.

12. The film of claim 9, wherein the second polymer (b) of the polymer mixture of the microporous layer is a copolymer of ethylene and α-olefin monomers having a crystallinity of greater than 20%.

* * * * *